US012639426B2

(12) United States Patent
Shah et al.

(10) Patent No.: US 12,639,426 B2
(45) Date of Patent: May 26, 2026

(54) METHOD OF VALIDATING DEFENSE MECHANISM OF AN AI SYSTEM

(71) Applicants: Robert Bosch GmbH, Stuttgart (DE); Robert Bosch Engineering and Business Solutions Private Limited, Bangalore (IN)

(72) Inventors: Adit Jignesh Shah, Ahmedabad (IN); Tanya Motwani, Ahmedabad (IN); Mayurbhai Thesia Yash, Ahmedabad (IN); Manojkumar Somabhai Parmar, Ahmedabad (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 162 days.

(21) Appl. No.: 18/693,912

(22) PCT Filed: Jun. 3, 2022

(86) PCT No.: PCT/EP2022/065254
§ 371 (c)(1),
(2) Date: Mar. 20, 2024

(87) PCT Pub. No.: WO2022/258537
PCT Pub. Date: Dec. 15, 2022

(65) Prior Publication Data
US 2024/0386095 A1 Nov. 21, 2024

(30) Foreign Application Priority Data
Jun. 10, 2021 (IN) .............................. 202141025797

(51) Int. Cl.
*G06F 21/55* (2013.01)

(52) U.S. Cl.
CPC ........ *G06F 21/55* (2013.01); *G06F 2221/033* (2013.01)

(58) Field of Classification Search
CPC .......................... G06F 21/55; G06F 2221/033
See application file for complete search history.

(56) References Cited

U.S. PATENT DOCUMENTS

2019/0095629 A1 3/2019 Lee et al.
2020/0082097 A1* 3/2020 Poliakov .............. G06F 21/577
(Continued)

OTHER PUBLICATIONS

International Search Report corresponding to PCT Application No. PCT/EP2022/065254, mailed Oct. 4, 2022 (English language document) (3 pages).

(Continued)

*Primary Examiner* — Gil H. Lee
(74) *Attorney, Agent, or Firm* — Maginot, Moore & Beck LLP

(57) ABSTRACT
A method of validating a defense mechanism of an artificial intelligence ("AI") system includes defining an optimizing function for a mean and a variance of parameters of input queries. The method further includes applying a Bayesian optimization algorithm on the input queries in dependence of the optimizing function followed by a Gaussian process at least twice to create a posterior distribution for the mean and the variance of parameters to reverse engineer the AI system. The method also includes feeding the AI system with a set of the input queries whose mean and variance of parameters have a high probability in the posterior distribution, and recording an output of the AI system to validate the defense mechanism of the AI system.

3 Claims, 3 Drawing Sheets

(56) References Cited

U.S. PATENT DOCUMENTS

| | | | |
|---|---|---|---|
| 2021/0224688 A1* | 7/2021 | Parmar | G06F 21/31 |
| 2021/0273967 A1* | 9/2021 | Vela | H04L 63/1466 |
| 2022/0150272 A1* | 5/2022 | Valiensi | H04L 63/1433 |
| 2023/0376645 A1* | 11/2023 | Shojaei | G06F 30/3308 |

OTHER PUBLICATIONS

Co, Kenneth T., "Bayesian Optimization for Black-Box Evasion of Machine Learning Systems", Imperial College London, Department of Computing, Sep. 2017 (57 pages).
Shukla et al., "Black-box Adversarial Attacks with Bayesian Optimization", Cornell University Library, Sep. 30, 2019 (12 pages).

* cited by examiner

200

METHOD OF VALIDATING DEFENSE MECHANISM OF AN AI SYSTEM

This application is a 35 U.S.C. § 371 National Stage Application of PCT/EP2022/065254, filed on Jun. 3, 2022, which claims the benefit of priority to Serial No. IN 2021 4102 5797, filed on Jun. 10, 2021 in India, the disclosures of which are incorporated herein by reference in their entirety.

The following specification describes and ascertains the nature of this disclosure and the manner in which it is to be performed.

The present disclosure relates to a method of validating defense mechanism of an AI system.

BACKGROUND

With the advent of data science, data processing and decision making systems are implemented using artificial intelligence modules. The artificial intelligence modules use different techniques like machine learning, neural networks, deep learning etc. Most of the AI based systems, receive large amounts of data and process the data to train AI models. Trained AI models generate output based on the use cases requested by the user. Typically the AI systems are used in the fields of computer vision, speech recognition, natural language processing, audio recognition, healthcare, autonomous driving, manufacturing, robotics etc. where they process data to generate required output based on certain rules/intelligence acquired through training.

To process the inputs and give a desired output, the AI systems use various models/algorithms which are trained using the training data. Once the AI system is trained using the training data, the AI systems use the models to analyze the real time data and generate appropriate result. The models may be fine-tuned in real-time based on the results. The models in the AI systems form the core of the system. Lots of effort, resources (tangible and intangible), and knowledge goes into developing these models.

It is possible that some adversary may try to capture/copy/extract the model from AI systems. The adversary may use different techniques to capture the model from the AI systems. One of the simple techniques used by the adversaries is where the adversary sends different queries to the AI system iteratively, using its own test data. There is a need to identify the most effective set of queries in the test data that can efficiently extract internal information about the working of the models in the AI system. The adversary uses the generated results to train its own models. By doing these steps iteratively, it is possible to capture the internals of the model and a parallel model can be built using similar logic. This will cause hardships to the original developer of the AI in the form of business disadvantages, loss of confidential information, loss of lead time spent in development, loss of intellectual properties, loss of future revenues etc. Hence there is a need to identify samples in the test data or generate samples that can efficiently extract internal information about the working of the models and test the defense mechanism of the AI system against those sample-based queries.

There are methods known in the prior arts to identify such attacks by the adversaries and to protect the models used in the AI system. The prior art US 20190095629A1-Protecting Cognitive Systems from Model Stealing Attacks discloses one such method. It discloses a method wherein the input data is processed by applying a trained model to the input data to generate an output vector having values for each of the plurality of pre-defined classes. A query engine modifies the output vector by inserting a query in a function associated with generating the output vector, to thereby generate a modified output vector. The modified output vector is then output. The query engine modifies one or more values to disguise the trained configuration of the trained model logic while maintaining accuracy of classification of the input data.

SUMMARY

In an exemplary embodiment of the disclosure, a method is for validating a defense mechanism of an artificial intelligence ("AI") system. The AI system is configured to process a range of input queries and give an output. The AI system comprises at least a submodule and a blocker module. The submodule is configured to recognize an input query as an attack vector. The blocker module is configured to modify the output when the input query is recognized as the attack vector. The method includes defining an optimizing function for a mean and a variance of parameters of the input queries. The method also includes applying a Bayesian optimization algorithm on the input queries in dependence of the optimizing function followed by a Gaussian process at least twice to create a posterior distribution for the mean and the variance of parameters to reverse engineer the AI system. The method further includes feeding the AI system with a set of the input queries whose mean and variance of parameters have a high probability in the posterior distribution, and recording the output of the AI system to validate the defense mechanism of the AI system.

BRIEF DESCRIPTION OF THE DRAWINGS

An embodiment of the disclosure is described with reference to the following accompanying drawings.

DETAILED DESCRIPTION

Figure 1:
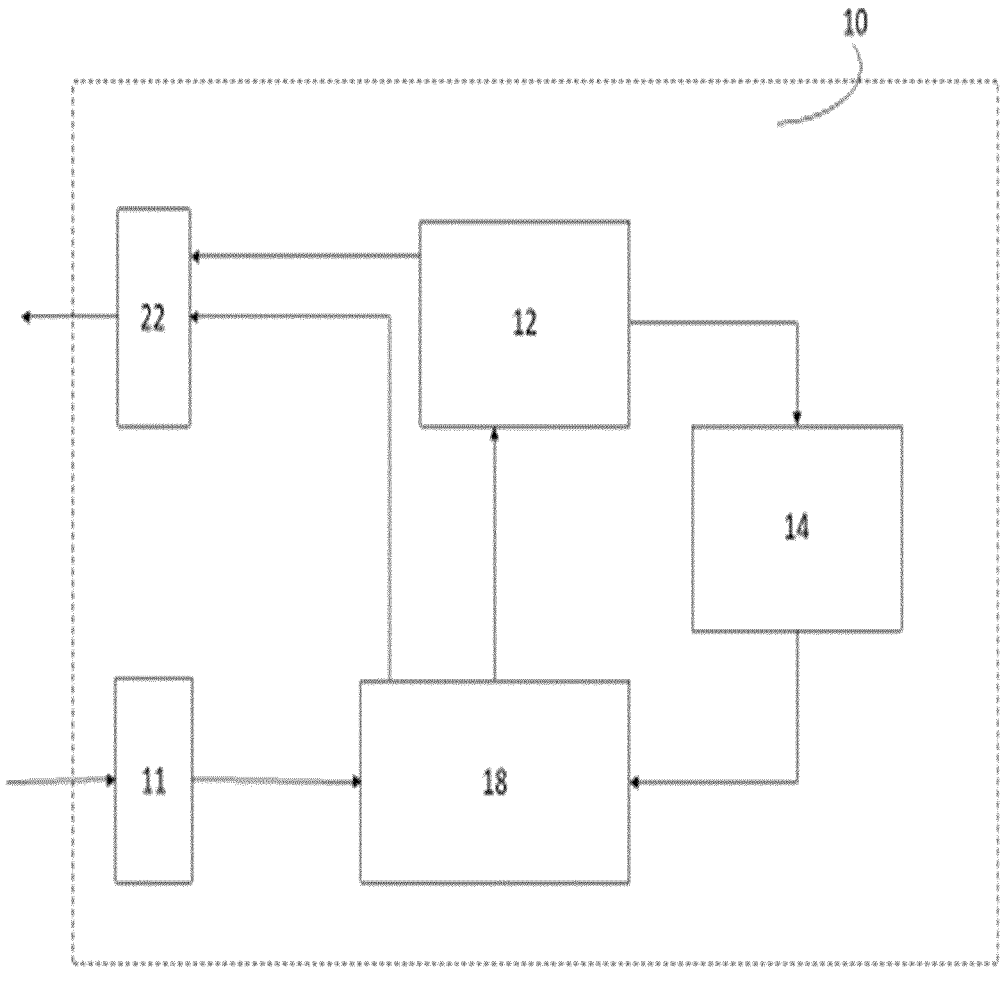
FIG. 1 depicts an AI system (10)

Some important aspects of the AI technology and AI systems can be explained as follows. Depending on the architecture of the implements AI systems may include many components. One such component is an AI module. An AI module with reference to this disclosure can be explained as a component which runs a model. A model can be defined as reference or an inference set of data, which is use different forms of correlation matrices. Using these models and the data from these models, correlations can be established between different types of data to arrive at some logical understanding of the data. A person skilled in the art would be aware of the different types of AI models such as linear regression, naïve bayes classifier, support vector machine, neural networks and the like. A person skilled in the art will also appreciate that the AI module may be implemented as a set of software instructions, combination of software and hardware or any combination of the same.

Some of the typical tasks performed by AI systems are classification, clustering, regression etc. Majority of classification tasks depend upon labeled datasets; that is, the data sets are labelled manually in order for a neural network to learn the correlation between labels and data. This is known as supervised learning. Some of the typical applications of classifications are: face recognition, object identification, gesture recognition, voice recognition etc. Clustering or grouping is the detection of similarities in the inputs. The cluster learning techniques do not require labels to detect similarities. Learning without labels is called unsupervised learning. Unlabeled data is the majority of data in the world. One law of machine learning is: the more data an algorithm can train on, the more accurate it will be. Therefore, unsupervised learning models/algorithms has the potential to produce accurate models as training dataset size grows.

As the AI module forms the core of the AI system, the module needs to be protected against attacks. Attackers attempt to attack the model within the AI module and steal information from the AI module. The attack is initiated through an attack vector. In the computing technology a vector may be defined as a method in which a malicious code/virus data uses to propagate itself such as to infect a computer, a computer system or a computer network. Similarly an attack vector is defined a path or means by which a hacker can gain access to a computer or a network in order to deliver a payload or a malicious outcome. A model stealing attack uses a kind of attack vector that can make a digital twin/replica/copy of an AI module.

The attacker typically generates random queries of the size and shape of the input specifications and starts querying the model with these arbitrary queries. This querying produces input-output pairs for random queries and generates a secondary dataset that is inferred from the pre-trained model. The attacker then take this I/O pairs and trains the new model from scratch using this secondary dataset. This is a black box model attack vector where no prior knowledge of original model is required. As the prior information regarding model is available and increasing, attacker moves towards more intelligent attacks.

The attacker chooses relevant dataset at his disposal to extract model more efficiently. Our aim through this disclosure is to identify parameters of queries that give the best input/output pair needed to train the model. We employ a constrained, structured and global search algorithm using Bayesian Optimization and Gaussian Process that explores the search space in minimum number of steps to find a combination of parameters that are close to the optimal combination and the minimum number of queries required to copy/extract/steal the AI model. Once the set of queries in the dataset that can efficiently steal the model are identified, we test the defense mechanism of the AI system against those queries.

FIG. 1 depicts an AI system (10). The AI system (10) is configured to process a range of input queries by means of AI module and give an output. The AI system (10) comprises a submodule (14) and at least a blocker module (18) amongst other components known to a person skilled in the art such as the input interface (11), output interface (22) and the like. For simplicity only components having a bearing on the methodology disclosed in the disclosure have been elucidated. The submodule (14) is configured to recognize an attack vector from amongst the input queries.

In an embodiment the submodule (14) comprises at least two AI models and a comparator. The said at least two or more models could be any from the group of linear regression, naïve Bayes classifier, support vector machine, neural networks and the like. However at least one of the models is the same as the one executed by the AI module. For example if the AI module executes a convolutional neural network (CNN) model, at least one module inside the submodule (14) will also execute the CNN model. The input query is passed through these at least two models and then their result is compared by the comparator to identify an attack vector from amongst the input queries.

In another embodiment of the AI system (10), the submodule (14) additionally comprises a pre-processing block that transposes or modifies the fidelity of input it receives into at least two subsets. These subsets are then fed to the said at least two models and theirs results compared by the comparator.

The AI system (10) further comprises at least a blocker module (18) configured to block a user when the AI system (10) recognizes the input query as an attack vector. The blocker module (18) is further configured to modify the output generated by an AI module. This is done only when the input is identified as an attack vector by the submodule (14).

Figure 2:
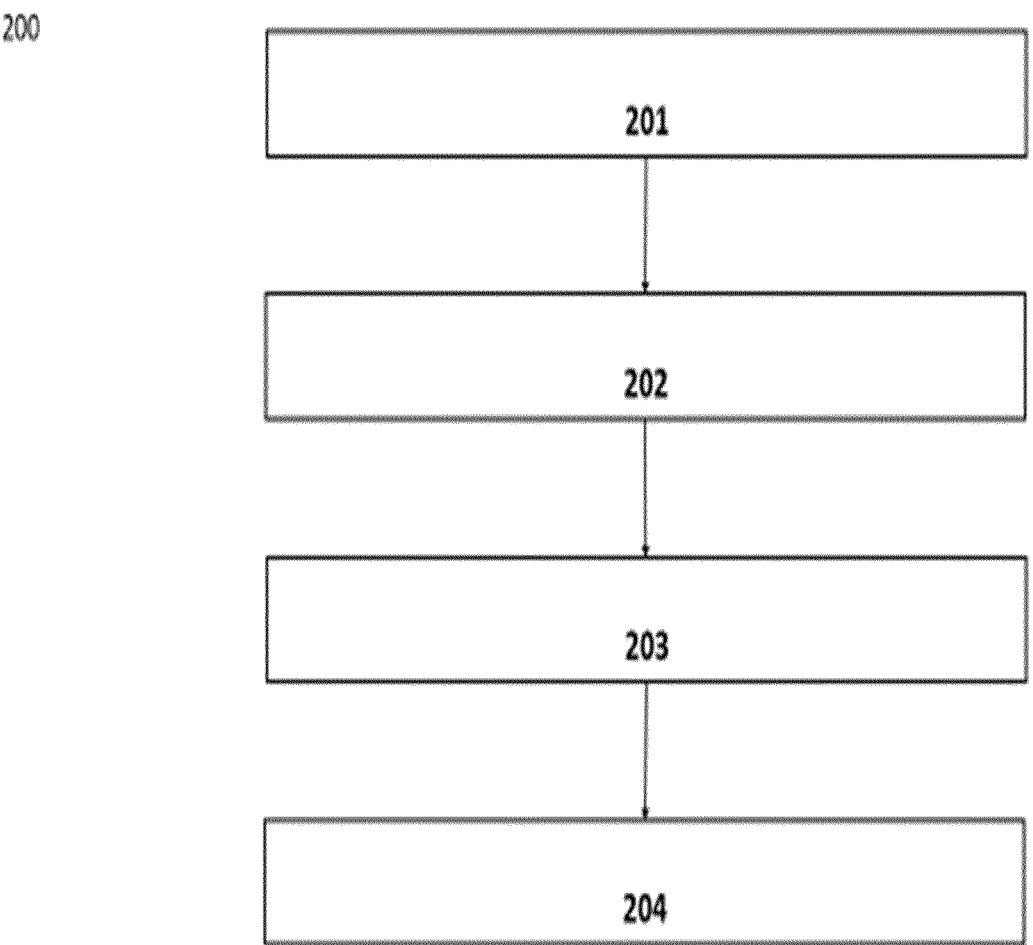
FIG. 2 illustrates method steps of validating defense mechanism of the AI system (10)

FIG. 2 illustrates method steps (200) of validating defense mechanism of the AI system (10). In step 201, an optimizing function for a mean and a variance of parameters of the said input queries is defined. The optimizing function defines the boundary conditions for the maxima or minima of said mean and variance of parameters of input queries. In step 202, a Bayesian optimization algorithm is applied on said input queries in dependence of the said optimizing function followed by a Gaussian process at least twice to create a posterior distribution for the mean and variance of parameters that can generate small number of queries to reverse engineer the AI system (10) efficiently. This application of the Bayesian optimization algorithm followed by a Gaussian process is iteratively for a certain number of times until an accurate posterior distribution is plotted as shown in FIG. 3.

Figure 3:
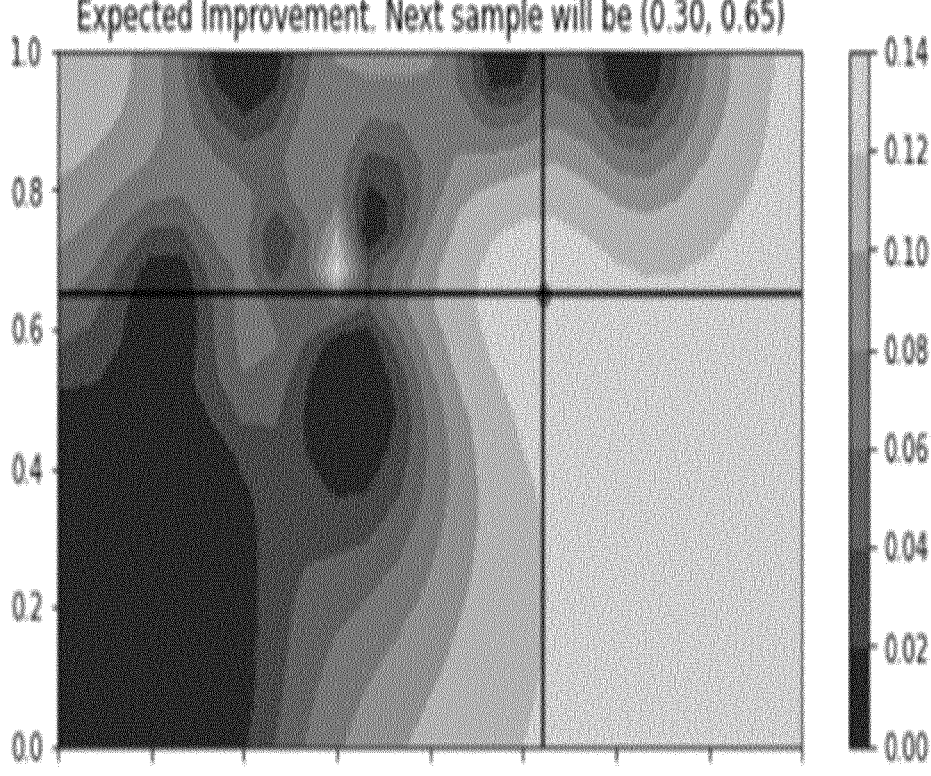
FIG. 3 depicts a posterior distribution for the mean and variance parameters to generate queries to reverse engineer the AI system (10).

FIG. 3 depicts a posterior distribution for the mean and variance of parameters that can generate small number of queries to reverse engineer the AI system (10) efficiently. We find the optimum parameters (needed to generate queries) and training process for the required model, and generate an autonomous script for the training process. Using Bayesian inference, we construct a posterior distribution of gaussian processes that best describe or reverse engineer the model. This process is repeated multiple times. As the number of steps increase, this distribution improves, and the algorithm understands which regions of the parameter space are worth looking and exploring into. At each step, a Gaussian process is fitted over the previously explored samples, and the posterior distribution, and combined with a search strategy, we determine the next region that should be explored (as shown in FIG. 3). The algorithm results in the best combination of parameters and target value which can be further used to generate optimal queries that could successfully exploit the latent space of the AI model (12) for efficient extraction.

In step 203, the AI system (10) is fed with a set of input queries whose mean and variance of parameters have a high probability in the posterior distribution. For example all areas shown in the lightest shade of grey have the highest probability of reverse engineering the AI system (10). Such values are fed into the AI system (10). In step 204, the output of the AI system (10) is recorded to validate defense mechanism of the AI system (10). Recording the output of the AI system (10) further comprises determining the percentage of modified outputs. Based on the modified outputs, it is inferred that how many of the input queries were recognized as attack vectors by defense of the AI system (10) i.e. by the submodule (14). This validates the defense mechanism of the AI system (10).

It must be understood that the disclosure in particular discloses methodology used for validating defense mechanism of an AI system (10). While these methodologies describes only a series of steps to accomplish the objectives, these methodologies are implemented in AI system (10), which may be a combination of hardware, software and a combination thereof.

It must be understood that the embodiments explained in the above detailed description are only illustrative and do not limit the scope of this disclosure. Any modification to the method of validating defense mechanism of an AI system (10) are envisaged and form a part of this disclosure. The scope of this disclosure is limited only by the claims.

We claim:

1. A method of validating a defense mechanism of an artificial intelligence ("AI") system, the method comprising:

defining an optimizing function for a mean and a variance of parameters of input queries;

applying a Bayesian optimization algorithm on the input queries in dependence of the defined optimizing function followed by a Gaussian process at least twice to create a posterior distribution for the mean and the variance of parameters to reverse engineer an AI model of the AI system;

feeding the AI system with a set of the input queries whose mean and variance of parameters have a high probability in the posterior distribution;

processing the set of the input queries to generate a set of outputs by executing the AI model with a processor of the AI system;

recognizing that respective input queries in the set of the input queries are attack vectors by executing a submodule of the AI system with the processor;

modifying respective outputs in the set of outputs corresponding to the respective input queries, in response to recognizing that the respective input queries are the attack vectors, by executing a blocker module of the AI system with the processor; and recording the set of outputs of the AI system to validate the defense mechanism of the AI system, the defense mechanism including the submodule and the blocker module.

2. The method as claimed in claim 1, wherein the optimizing function defines boundary conditions for a maxima or minima of the mean and the variance of parameters of the input queries.

3. The method as claimed in claim 1, wherein recording the set of outputs of the AI system further comprises determining a percentage of modified outputs in the set of outputs.

\* \* \* \* \*